United States Patent
Wozniak et al.

(10) Patent No.: US 10,046,737 B2
(45) Date of Patent: Aug. 14, 2018

(54) WIPER ARM WITH INTEGRAL ALIGNMENT KEY

(71) Applicant: TRICO PRODUCTS CORPORATION, Rochester Hills, MI (US)

(72) Inventors: Paul Wozniak, Rochester Hills, MI (US); Michael Wilson, Rochester Hills, MI (US); Kyle Moll, Oxford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

(21) Appl. No.: 15/783,665

(22) Filed: Oct. 13, 2017

(65) Prior Publication Data

US 2018/0105138 A1 Apr. 19, 2018

Related U.S. Application Data

(60) Provisional application No. 62/408,681, filed on Oct. 14, 2016.

(51) Int. Cl.
*B60S 1/34* (2006.01)
*B60S 1/04* (2006.01)
*B60S 1/18* (2006.01)

(52) U.S. Cl.
CPC ............... *B60S 1/0441* (2013.01); *B60S 1/18* (2013.01); *B60S 1/3436* (2013.01); *B60S 1/3443* (2013.01); *B60S 1/3459* (2013.01); *Y10T 403/7026* (2015.01); *Y10T 403/7033* (2015.01); *Y10T 403/7035* (2015.01)

(58) Field of Classification Search
CPC .... B60S 1/3459; B60S 1/3461; B60S 1/3436; B60S 1/3443; Y10T 403/7026; Y10T 403/7033; Y10T 403/7035
USPC ........ 15/250.34; 403/355, 356, 395.1, 359.5, 403/359.6
See application file for complete search history.

(56) References Cited

U.S. PATENT DOCUMENTS

| | | | | |
|---|---|---|---|---|
| 2,286,035 | A * | 6/1942 | Horton | B60S 1/34 15/250.34 |
| 4,601,182 | A * | 7/1986 | Glanzmann | B60R 25/0222 403/13 |
| 4,728,218 | A * | 3/1988 | Durham | B62H 5/06 403/319 |
| 2005/0120503 | A1* | 6/2005 | Park | B60S 1/3459 15/250.34 |

* cited by examiner

*Primary Examiner* — Gary Graham
(74) *Attorney, Agent, or Firm* — Miller Canfield

(57) ABSTRACT

A wiper arm for supporting a wiper blade includes a wiper arm head comprises a recessed splined cup portion having a plurality of angularly adjacent teeth about the internal circumference of the cup portion wherein the cup portion includes a slot. A complementary drive shaft includes a splined head having teeth for mating engagement with the teeth in the wiper arm head. In order to facilitate the alignment therebetween, an integral alignment key is received in the axially aligned slots. The alignment key further includes a lower notched end which abuts against a bottom radial lip of the splined head to prevent the key from moving axially in the slots. As such, the key and the splined head include complementary formations preventing the key from accidentally falling out of the slots.

18 Claims, 4 Drawing Sheets

WIPER ARM WITH INTEGRAL ALIGNMENT KEY

CROSS REFERENCE TO RELATED APPLICATION

This application asserts priority from provisional application 62/408,681, filed on Oct. 14, 2016, which is incorporated herein by reference.

BACKGROUND OF THE INVENTION

1. Field of the Invention

The present invention relates to a wiper arm with an integral alignment key for an automotive vehicle. More particularly, the invention relates to a wiper arm with an integral alignment key for properly aligning the wiper arm with a splined shaft of a drive motor or linkage assembly.

2. Description of Related Art

Windshield wipers for use on automotive vehicles include an elongated wiper arm for supporting a wiper blade to wipe the surface of the windshield of the vehicle. One end of the wiper arm is fixedly coupled to a splined shaft of a drive motor or linkage assembly for driving the wiper arm in a reciprocal motion along the windshield. The wiper arm commonly includes a splined wiper arm head meshed with and coupled to a splined shaft extending from the drive motor or linkage assembly. A spring latch or nut fixedly secures the wiper arm head to the splined shaft for reciprocal motion of the wiper arm in response to reciprocal rotation of the drive shaft.

It is known to also provide an alignment key secured to the wiper arm head and received in a corresponding notch in the drive shaft for proper aligning the splined wiper arm head with the splined shaft. It is also known to form the key integrally into the splined drive shaft and fit into a recess in the wiper arm head as shown in U.S. Pat. No. 4,050,832.

However, the press fit alignment key has a tendency to accidentally fall out of the wiper arm head due to vibration during operation or during wiper service. Therefore, it is desirable to provide an integral alignment key press fit into drive shaft yet selectively removable if so desired.
Generally, therefore, the invention relates to a wiper arm for supporting a wiper blade, which includes a wiper arm head that comprises a recessed splined cup portion having a plurality of angularly adjacent teeth about the internal circumference of the cup portion wherein the cup portion includes a slot. A complementary drive shaft includes a splined head having teeth for mating engagement with the teeth in the wiper arm head. In order to facilitate the alignment therebetween, an integral alignment key is received in the axially aligned slots. The alignment key further includes a lower notched end which abuts against a bottom radial lip of the splined head to prevent the key from moving axially in the slots. As such, the key and the splined head include complementary formations preventing the key from accidentally falling out of the slots, which overcomes disadvantages associated with the prior art.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
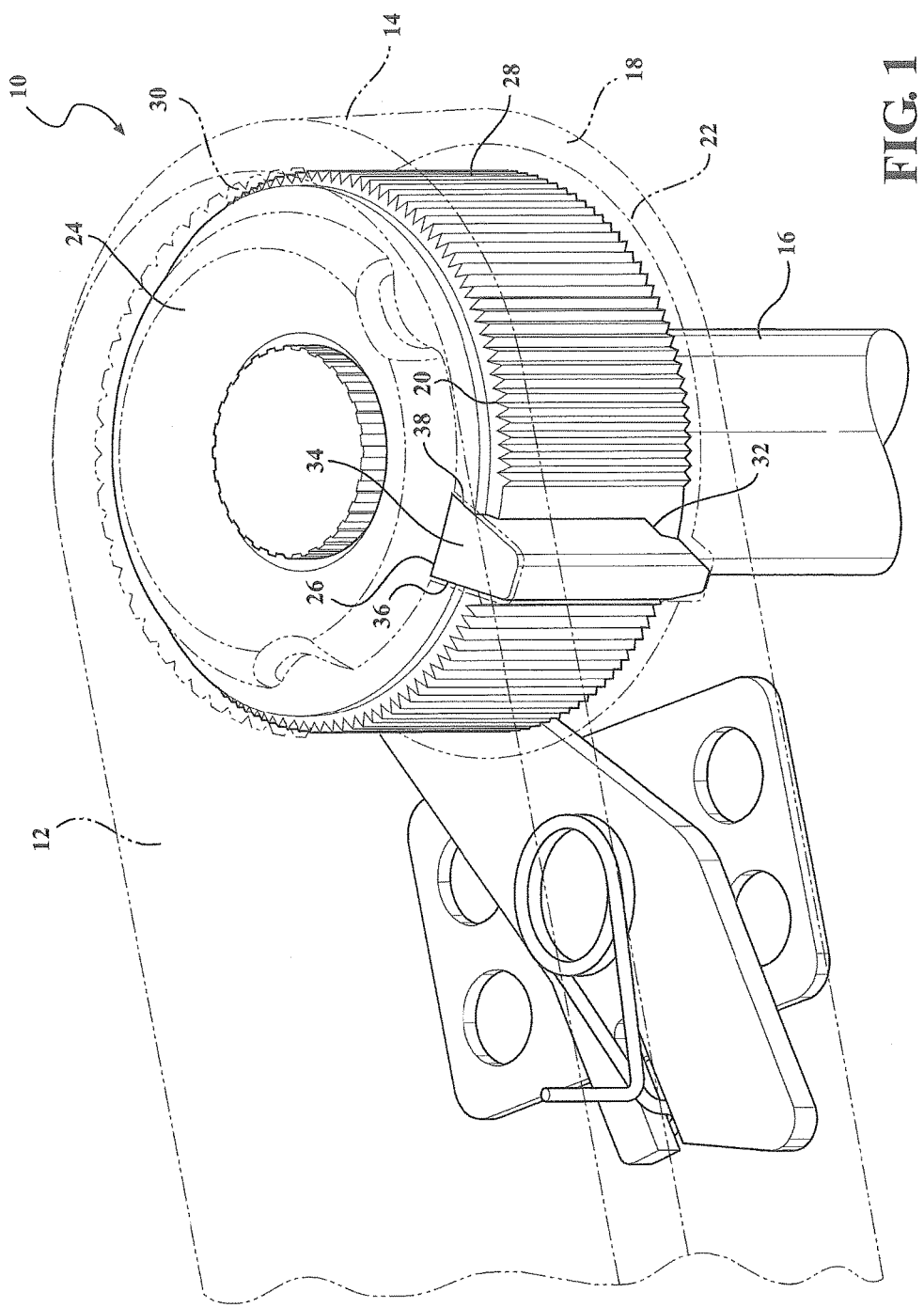
FIG. 1 is a fragmentary top perspective view of a drive shaft and wiper arm with integral alignment key according to one embodiment of the invention.
Figure 2:
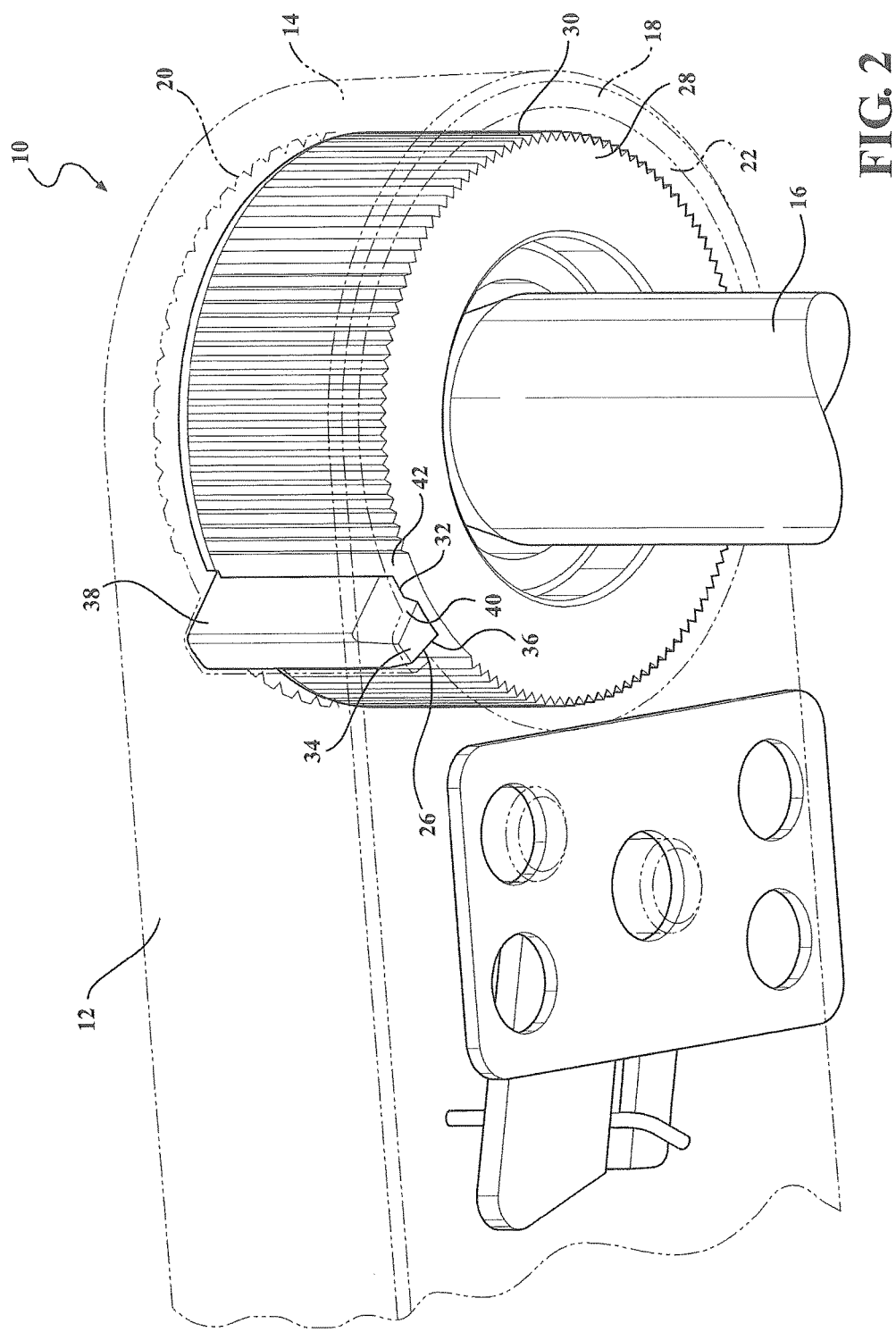
FIG. 2 is a fragmentary bottom perspective view of the drive shaft and wiper arm with integral alignment key of FIG. 1.
Figure 3:
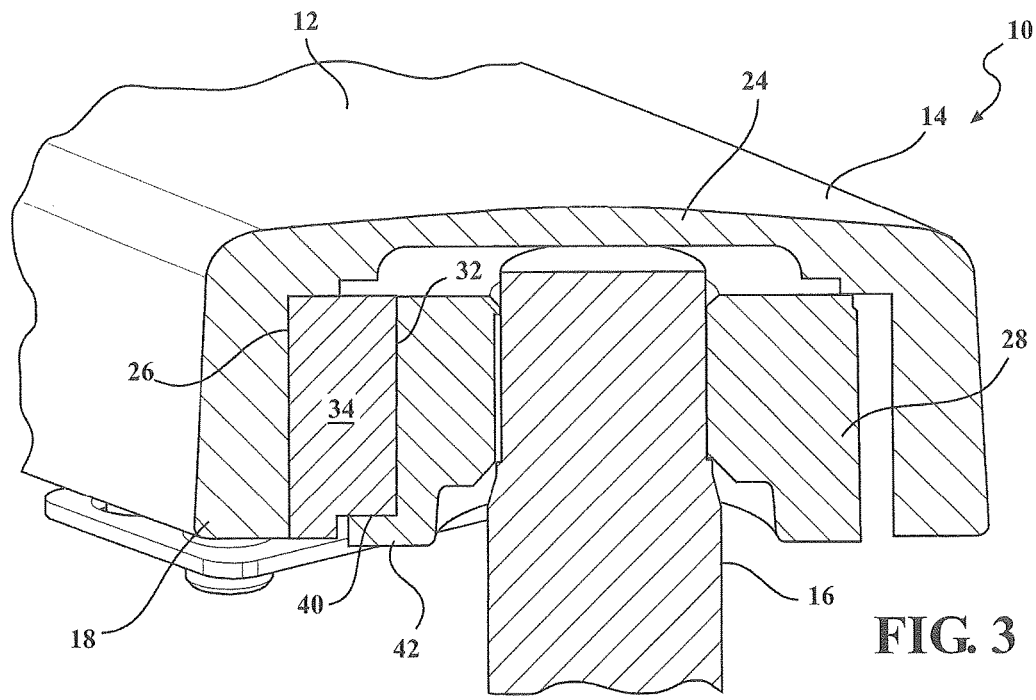
FIG. 3 is a cross-sectional side view of the drive shaft and wiper arm with integral alignment key of FIG. 1.

Referring to the Figures, wherein like numerals indicate like or corresponding parts throughout the several views, a wiper assembly is partially shown at 10 is FIGS. 1-3 according to one embodiment of the invention. The wiper assembly 10 includes a wiper arm 12 for supporting a wiper blade (not shown) for wiping the surface of a windshield of an automotive vehicle. The wiper arm 12 includes a u-shaped wiper arm head 14 adapted to be coupled to a drive shaft 16 of a wiper motor or linkage assembly (not shown). The wiper motor rotates the drive shaft 16 in a reciprocal motion to thereby reciprocate the wiper arm across the windshield.

The wiper arm head 14 comprises a recessed splined cup portion 18 having a plurality of teeth 20 extending axially between an opened end 22 and a closed end 24 and being disposed angularly adjacent to each other about the internal circumference of the cup portion 18. The cup portion 18 further includes an elongated axial slot 26 formed therein between a pair of the teeth 20, which are angularly or circumferentially spaced apart from each other on opposite sides of the slot 26. The drive shaft 16 includes a splined head 28 having a plurality of axially extending teeth 30, which are disposed angularly adjacent to each other for mating engagement with the teeth 20 formed in the wiper arm head 14. The teeth 30 extend about an outer circumference or periphery of the splined head 28. The splined head 28 also includes an elongated axial slot 32 corresponding to the axial slot 26 in the wiper arm head 14, wherein the slot 32 is formed between an angularly spaced pair of teeth 30. Each of the slots 26, 32 include tapered sidewalls as will be further discussed hereinbelow, and open vertically from respective opposite slot ends.

During assembly of the wiper arm 12 to the drive shaft 16, the wiper arm 12 must be angularly aligned relative to the drive shaft 16 for proper positioning of the wiper assembly 10 relative to the vehicle windshield. In order to facilitate the alignment therebetween, an integral alignment key 34 is provided and adapted to be received in the axially aligned slots 26, 32 between the wiper arm head 14 and the drive shaft 16. More specifically, as shown in FIG. 1, the alignment key 34 is wedge shaped with tapered sidewalls 36, 38 and press fit into the correspondingly tapered slot 32 in the drive shaft head 16 to prevent the alignment key 34 from moving radially within the slot 32. The drive shaft head 16 and alignment key 34 is then axially aligned with the slot 26 in the wiper arm head 14 and then pressed into the slot 26. The alignment key 34 includes a lower notched end 40 which abuts against a bottom radial lip 42 in the slot 32 of the splined head 28 to prevent the key 34 from moving axially in the slots 26, 32 and preventing the key 34 from accidentally falling out of the slots 26, 32. As such, the alignment key and the splined head include complementary formations which prevent the key from falling out of the slots 26, 32.

Figure 5:
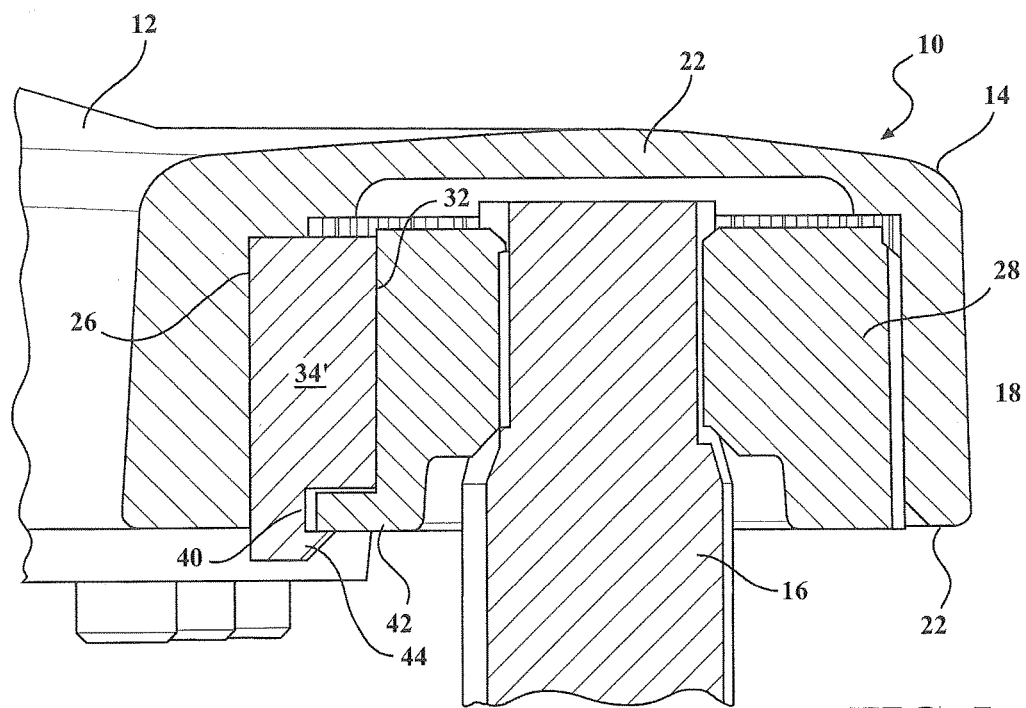
FIG. 5 is a cross-sectional side view of the drive shaft and wiper arm with integral alignment key of FIG. 4.
Figure 4:
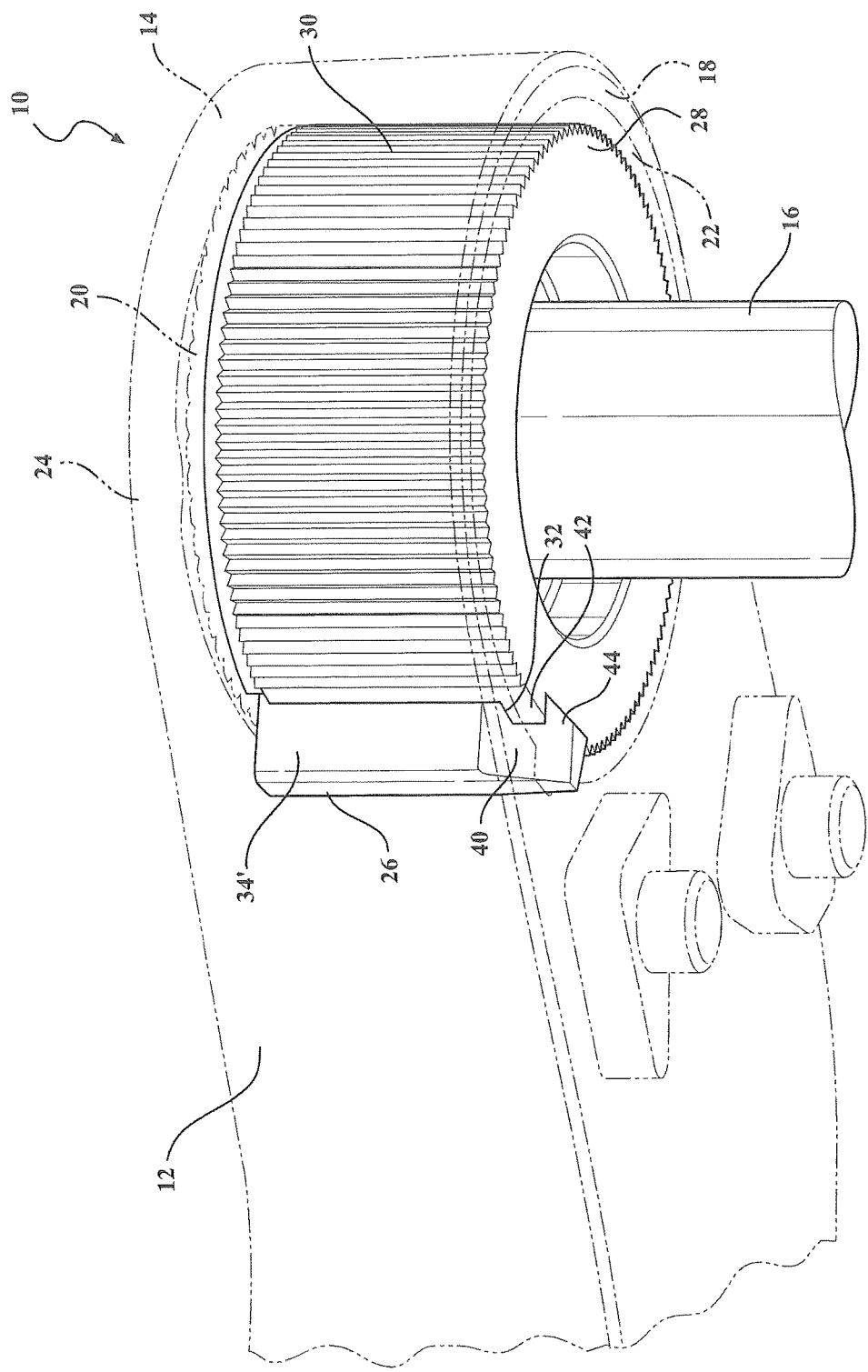
FIG. 4 is a fragmentary perspective view of a drive shaft and wiper arm with integral alignment key according to alternative embodiment of the invention.

Referring to FIGS. 4 and 5, an alternative embodiment of an alignment key is shown at 34'. The alignment key 34' of the alternative embodiment also includes a tapered latch lip 44 spaced below the lower notch 40 at the bottom end of the alignment key 34' for capturing and latching the radial lip 42 in the slot 32 of the splined head 28 within the lower notch 40 of the alignment key 34'. The lower notch 40 and latch lip 44 also prevent the key 34 from moving axially in the slots 26, 28 and prevent the key 34' from accidentally falling out of the slots 26, 32 while also facilitate removal of the key 34' if necessary for service by flexing the latch lip 44 radially away from the radial lip 42. Similar to the first embodiment above, the alignment key 34' and the splined head 28 include complementary formations which prevent the key from falling out of the slots 26, 32.

In both of these embodiments, a latch 50 preferably is provided, which preferably includes a pivotable latch arm 51, a support plate 52 and a biasing member 53 such as a spring. The latch arm 51 is able to pivot from a clearance position clear of the drive shaft head 28 to a locking position seen in FIG. 5 wherein the latch arm 51 is disposed below the drive shaft head 28 to prevent removal of the drive shaft head 28 from the cup portion 18 and thereby removably join the drive shaft 16 to the wiper arm 12. As seen for example in FIG. 5, the key 34 may be angularly spaced from the latch 51 such that the latch arm 51 typically would not prevent removal of the key 34. Rather, the above described formations such as lip 42 prevent inadvertent removal of the key 34 through the bottom of the slots 26, 32. However, if desired, the key 34 might still be removed upwardly from the top of the slots 26, 32 such as during repair or replacement of wiper components when the wiper arm 12 is removed from the drive shaft head 28.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

We claim:

1. A wiper assembly comprising:
a wiper arm for supporting a wiper blade for a windshield of an automotive vehicle, said wiper arm comprising a wiper arm head comprising a recessed splined cup portion having a plurality of first teeth which are disposed angularly adjacent to each other about an inner circumference of said cup portion, said cup portion further including an elongated axial first slot formed therein between an angularly spaced pair of said first teeth, wherein said first slot is vertically open;
a drive shaft splined head rotatable by a drive shaft and mountable on said wiper arm head, said drive shaft head having a plurality of second teeth, which are disposed angularly adjacent to each other about an outer periphery of said drive shaft head, said drive shaft head also including an elongated axial second slot corresponding to said first slot in said wiper arm head, said second slot being formed between an angularly spaced pair of said second teeth, wherein said second slot is vertically open and is aligned with said first slot when said drive shaft head is mounted on said wiper arm head; and
an alignment key adapted to be received in said first and second slots when axially aligned between said wiper arm head and said drive shaft head to define an orientation of said wiper arm relative to said drive shaft head, said key and said splined head include complementary formations which prevent said key from falling out of said first and second slots when said wiper arm head is mounted on said drive shaft head.

2. The wiper assembly according to claim 1, wherein each of said first and second slots extends axially and opens from at least one of opposite bottom and top ends.

3. The wiper assembly according to claim 2, wherein said first slot is open on said bottom end thereof for receiving said key, said second slot is open on said top end thereof for receiving said key, and said bottom end of said second slot including a bottom radial lip to prevent said key from falling out of said first and second slots.

4. The wiper assembly according to claim 3, wherein said key includes a lower notched end which abuts against said bottom radial lip of said second slot.

5. The wiper assembly according to claim 4, wherein said key includes a tapered latch lip spaced below the lower notched end for capturing and latching said bottom radial lip.

6. The wiper assembly according to claim 1, wherein said key is wedge shaped with tapered sidewalls and press fit into said second slot which is correspondingly tapered in said drive shaft head to prevent said key from moving radially within said second slot.

7. The wiper assembly according to claim 6, wherein each of said first and second slots includes tapered sidewalls which correspond to said wedge shape of said key.

8. The wiper assembly according to claim 1, wherein a latch is provided on said wiper arm which is able to pivot to a locking position engaged with said drive shaft splined head to prevent removal of said drive shaft head from said wiper arm head.

9. The wiper assembly according to claim 8, wherein said latch is disposed below said drive shaft splined head when in said locking position to removably lock said wiper arm head on said driver shaft head.

10. The wiper assembly according to claim 9, wherein said key is angularly spaced from said latch.

11. A wiper assembly comprising:
a wiper arm for supporting a wiper blade for a windshield of an automotive vehicle, said wiper arm comprising a wiper arm head which includes a recessed splined cup portion having a plurality of first teeth which are disposed angularly adjacent to each other about an inner circumference of said cup portion, said cup portion further including an elongated axial first slot formed therein between an angularly spaced pair of said first teeth, wherein said first slot is vertically open;
a drive shaft head rotatable by a drive shaft and mountable on said wiper arm head, said drive shaft head having a plurality of second teeth, which are disposed angularly adjacent to each other about an outer periphery of said drive shaft head, said drive shaft head also including an elongated axial second slot corresponding to said first slot in said wiper arm head, said second slot being formed between an angularly spaced pair of said second teeth, wherein said second slot is vertically open and is aligned with said first slot when said drive shaft head is mounted on said wiper arm head; and an alignment key adapted to be received in said first and second slots when axially aligned between said wiper arm head and said drive shaft head to define an orientation of said wiper arm relative to said drive shaft head, said first slot being open on said bottom end thereof and said second slot being open on said top end thereof for receiving said key in said first and second slots, said bottom end of said second slot including a bottom radial lip which engages said key to prevent said key from falling out of said first and second slots.

12. The wiper assembly according to claim 11, wherein said key includes a lower notched end which abuts against said bottom radial lip of said second slot.

13. The wiper assembly according to claim 12, wherein said key includes a tapered latch lip spaced below the lower notched end for capturing and latching said bottom radial lip.

14. The wiper assembly according to claim 11, wherein said key is wedge shaped with tapered sidewalls and is press fit into said second slot which is correspondingly tapered in said drive shaft head to prevent said key from moving radially within said second slot.

15. The wiper assembly according to claim 14, wherein each of said first and second slots includes tapered sidewalls which correspond to said wedge shape of said key.

16. The wiper assembly according to claim 11, wherein a latch is provided on said wiper arm which is able to pivot from a clearance position clear of said drive shaft head to a locking position engaged with said drive shaft head to prevent removal of said drive shaft head from said wiper arm head.

17. The wiper assembly according to claim 16, wherein said latch is disposed below said drive shaft head when in said locking position to removably lock said wiper arm head on said driver shaft head.

18. The wiper assembly according to claim 17, wherein said key is angularly spaced from said latch.

\* \* \* \* \*